United States Patent
Hahn et al.

(10) Patent No.: US 10,212,590 B2
(45) Date of Patent: Feb. 19, 2019

(54) METHOD AND APPARATUS FOR AUTHENTICATING DEVICE IN WIRELESS COMMUNICATION SYSTEM

(71) Applicant: LG ELECTRONICS INC., Seoul (KR)

(72) Inventors: Genebeck Hahn, Seoul (KR); Jiwon Kang, Seoul (KR); Heejin Kim, Seoul (KR); Ilmu Byun, Seoul (KR); Heejeong Cho, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/665,717

(22) Filed: Aug. 1, 2017

(65) Prior Publication Data

US 2018/0054734 A1  Feb. 22, 2018

Related U.S. Application Data

(60) Provisional application No. 62/375,884, filed on Aug. 16, 2016.

(51) Int. Cl.
| | |
|---|---|
| *H04W 12/06* | (2009.01) |
| *H04L 29/06* | (2006.01) |
| *G06F 21/44* | (2013.01) |
| *H04W 48/08* | (2009.01) |
| *H04W 88/06* | (2009.01) |

(52) U.S. Cl.
CPC ............ *H04W 12/06* (2013.01); *G06F 21/44* (2013.01); *H04L 63/0876* (2013.01); *H04W 48/08* (2013.01); *H04W 88/06* (2013.01)

(58) Field of Classification Search
CPC ..... H04W 12/06; H04W 48/08; H04W 88/06; H04L 63/0876; G06F 21/44
USPC .................................................. 455/411, 410
See application file for complete search history.

(56) References Cited

U.S. PATENT DOCUMENTS

| | | | |
|---|---|---|---|
| 2010/0125732 A1* | 5/2010 | Cha ....................... | H04L 63/107 713/166 |
| 2011/0038480 A1* | 2/2011 | Lin ........................ | H04W 12/04 380/270 |
| 2011/0314522 A1* | 12/2011 | Palanigounder ....... | H04B 7/155 726/4 |
| 2012/0297474 A1* | 11/2012 | Zhang ................. | H04L 63/0823 726/10 |
| 2012/0302213 A1* | 11/2012 | Shu ....................... | H04W 36/12 455/411 |
| 2016/0353281 A1* | 12/2016 | Senarath ............... | H04W 12/06 |
| 2017/0012778 A1* | 1/2017 | Choyi ................. | H04L 63/0884 |

(Continued)

*Primary Examiner* — Mong-Thuy T Tran
(74) *Attorney, Agent, or Firm* — Dentons US LLP

(57) ABSTRACT

Disclosed are an authentication method performed by a radio access network (RAN) node in a wireless communication system and an apparatus thereof. In the present disclosure, a first message indicating initiation of an authentication procedure of the RAN node for multiple user equipments (UEs) used for a specific purpose to attach to a network is transmitted, an authentication request message including first security information for authenticating the network is received from the first network node, second security information for authenticating the RAN node is transmitted to the first network node, and a complete message indicating completion of the authentication procedure is received from the first network node.

12 Claims, 8 Drawing Sheets

(56) References Cited

U.S. PATENT DOCUMENTS

| | | | | |
|---|---|---|---|---|
| 2017/0034857 A1* | 2/2017 | Berggren | ............ | H04L 61/2007 |
| 2017/0034860 A1* | 2/2017 | Berggren | .............. | H04W 76/12 |
| 2017/0195930 A1* | 7/2017 | Tomici | ................. | H04W 36/14 |
| 2017/0244705 A1* | 8/2017 | Ha | ..................... | H04L 63/0876 |
| 2017/0318450 A1* | 11/2017 | Salkintzis | ............... | H04W 8/02 |

* cited by examiner

[Fig.1]
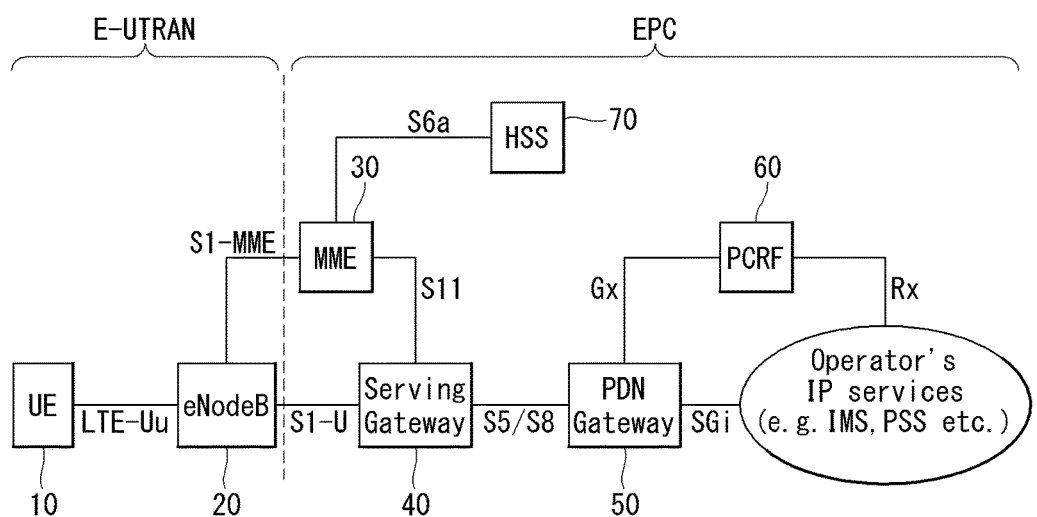

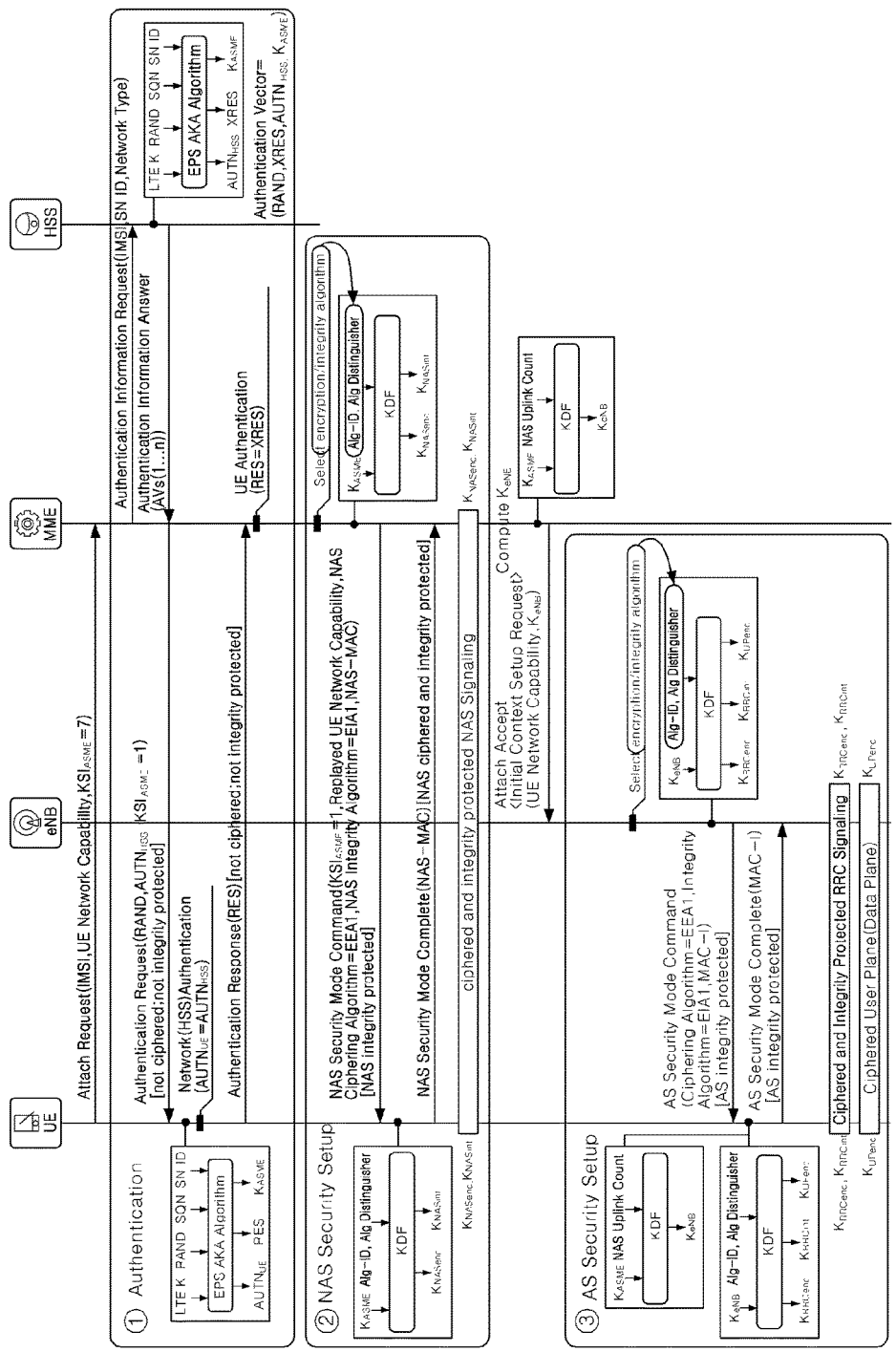
[Fig. 2]

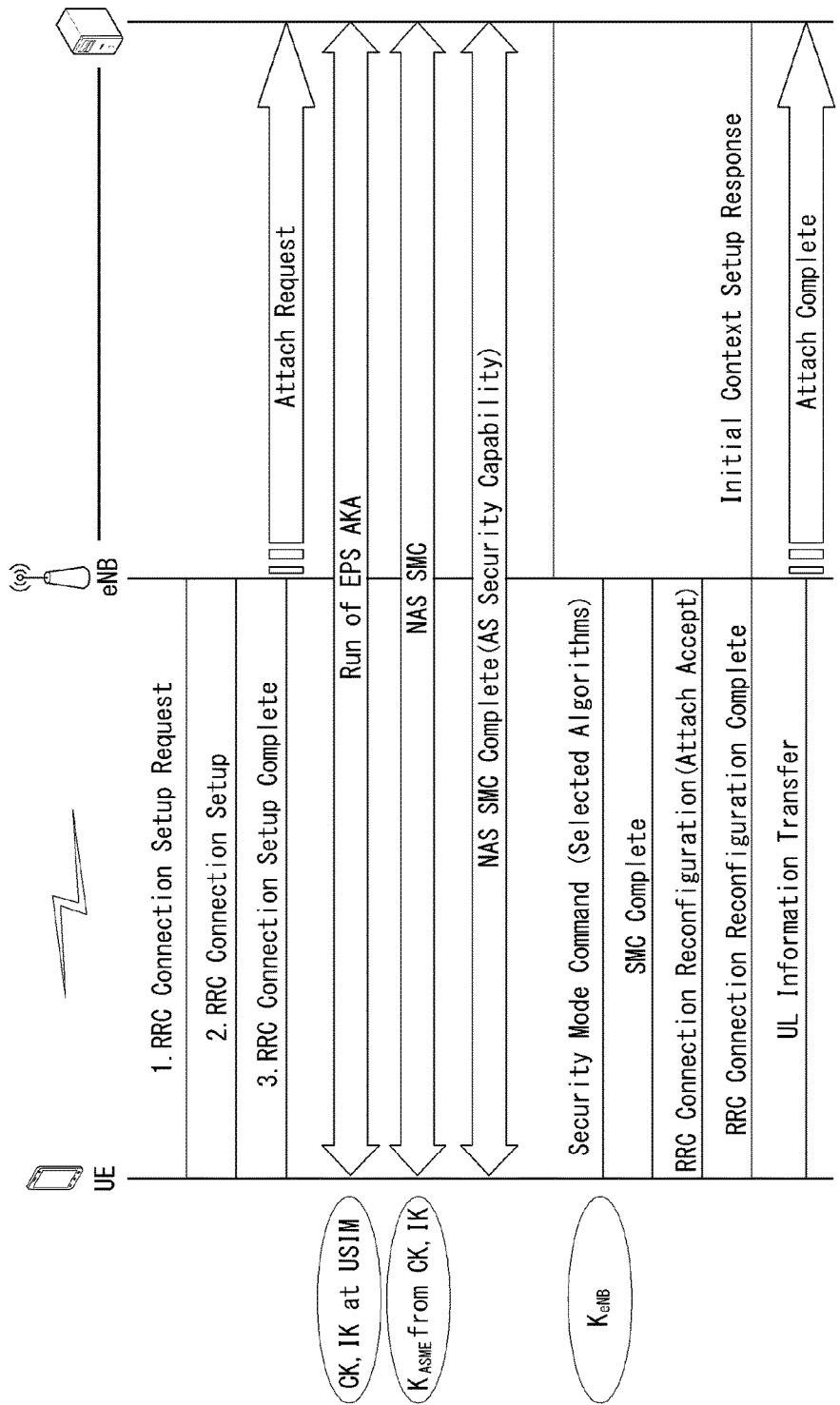

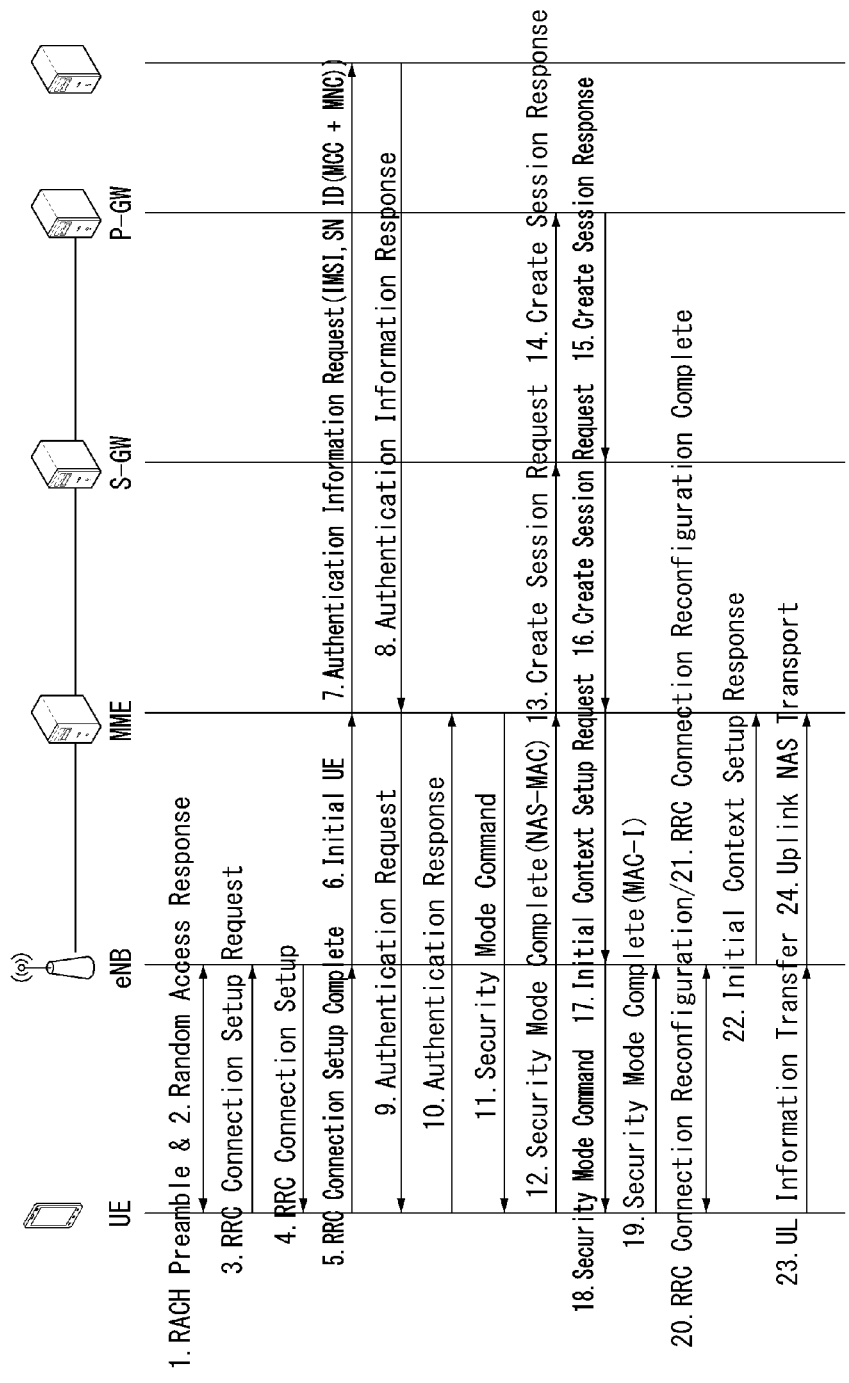
[Fig. 4]

[Fig.5]
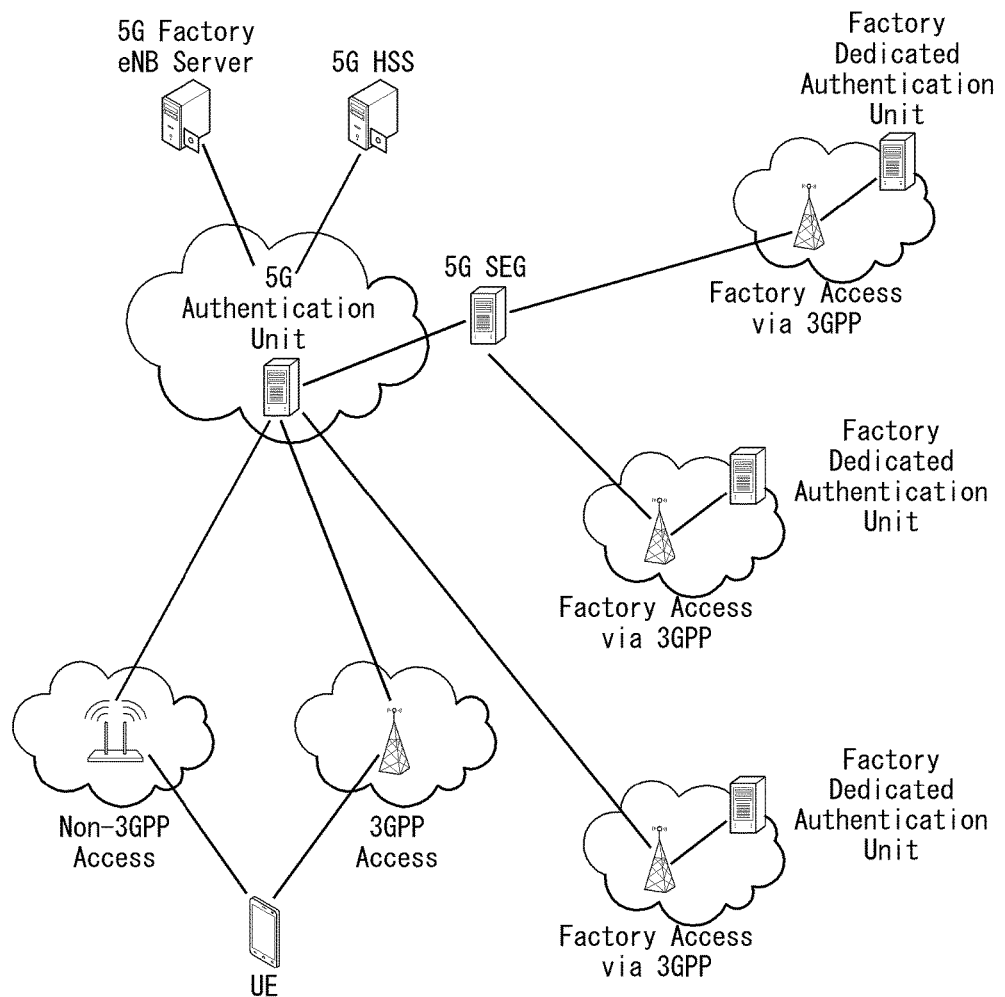

[Fig.6]
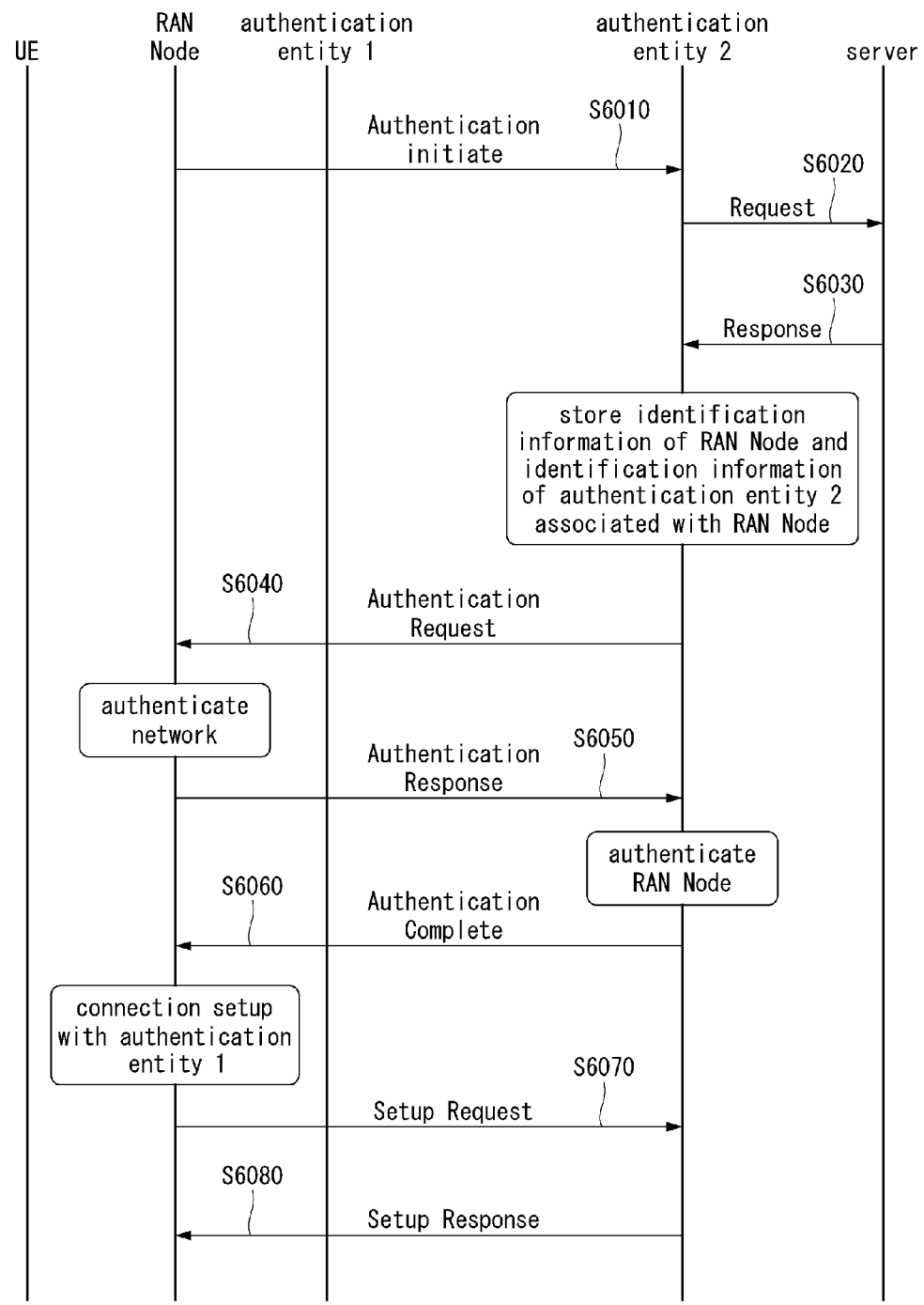

[Fig.7]
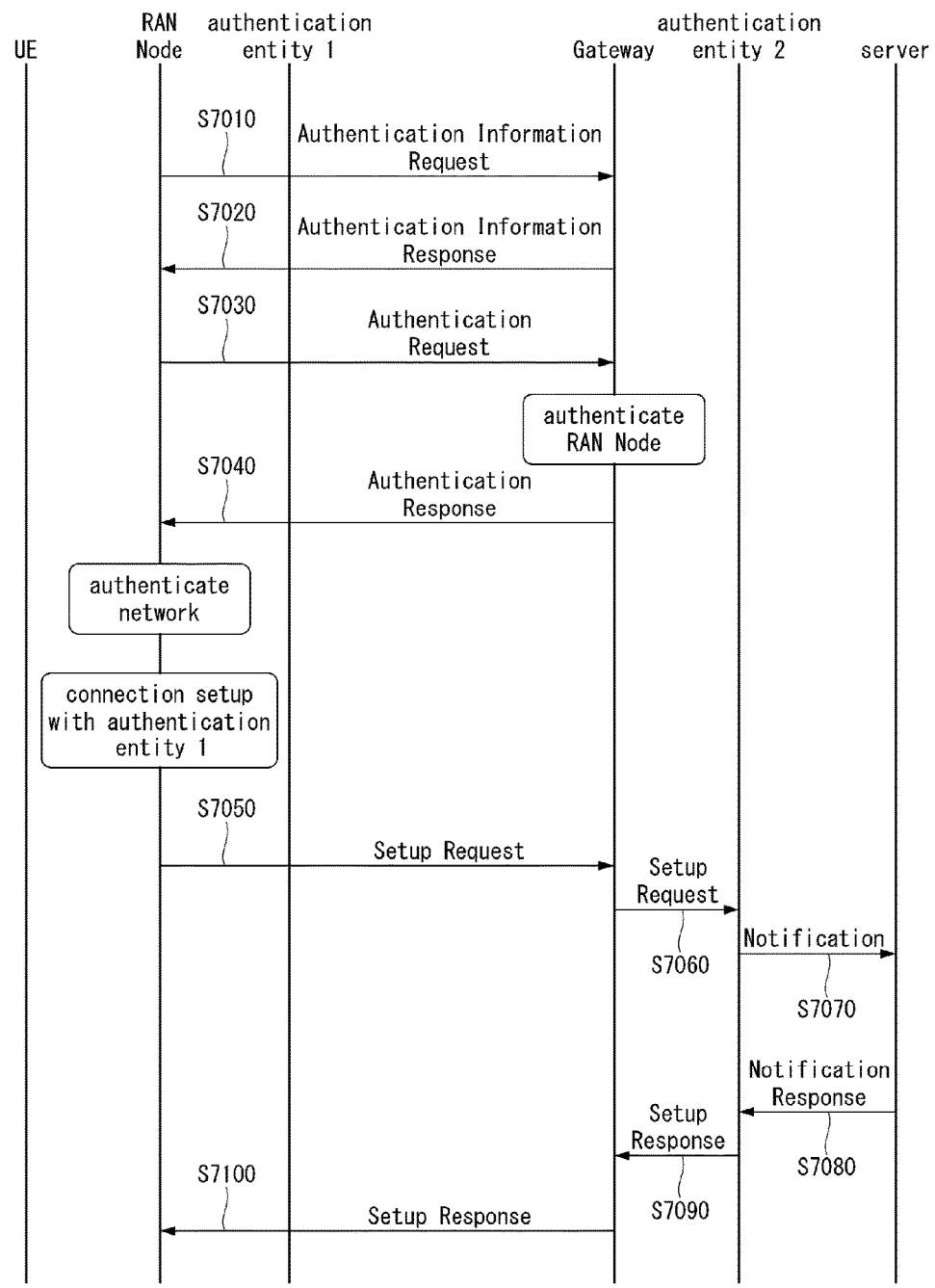

[Fig.8]
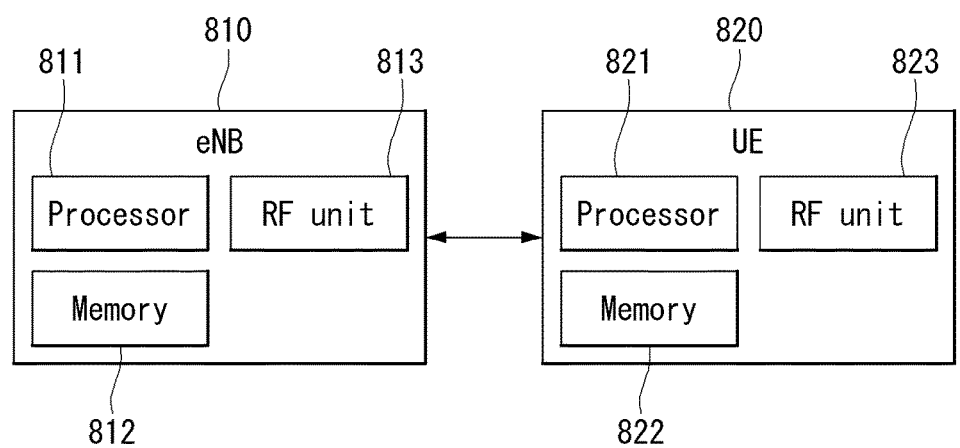

METHOD AND APPARATUS FOR AUTHENTICATING DEVICE IN WIRELESS COMMUNICATION SYSTEM

CROSS-REFERENCE TO RELATED APPLICATION

This application priority to Provisional Application No. 62/375,884 filed on 16 Aug. 2016 in US, the entire contents of which are hereby incorporated by reference in its entirety.

BACKGROUND

1. Field

The present disclosure relates to a wireless communication system and, more particularly, to a method and apparatus for authenticating a device in a wireless communication system.

2. Description of Related Art

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

Also, compared with security features evolved up to the specifications in the 4G mobile communication system, the security features expected to be added to the 5G mobile communication system may be described as follows.

The 5G mobile communication system has to accommodate a new type of service delivery model such as network slicing. Network slicing refers to providing a virtual isolated sub-network optimized for service characteristics and aims to provide optimized services for individual applications since requirements differ from application to application.

Accordingly, security architecture also needs to be very flexible according to service characteristics of each network slice, which indicates that the 5G mobile communication network has to be designed to reduce security-related overhead to accommodate network slicing.

The 5G mobile communication system has to be designed not only to provide new functions but also to accommodate new verticals (industries).

This aims to accommodate a new business model about how the mobile communication network and communication should be provided.

In other words, it indicates that a new trust model which takes into account various types of devices (for example, unattended machines, sensors, wearable devices, and vehicles) with security requirements different from each other and some important sectors (for example, public safety and eHealth) has to be defined.

The 5G mobile communication system has to provide optimized Multi-RAT operation. This feature is aimed to reduce OTA signaling and delay required to perform authentication or security setup for Multi-RAT access having a different security mechanism from each other.

In other words, in the existing 4G and previous standards, when connecting to a different RAT, separate authentication and security setting have been performed on a user equipment due to different authentication methods and security setup mechanisms such as key handling even if the user equipment accesses the same core network.

However, the 5G security specification requires that effective Multi-RAT security architecture capable of reducing such redundancy should be provided.

Meanwhile, one of the issues being discussed recently related to the 5G network architecture is to adopt a network slicing concept for the 5G new core network.

In addition, one of the architectural principles of the 5G core network states that a user equipment attaches to a network without setting a session for data transmission, network slices are isolated/separated from each other, and a core network instance (for example, a network slice) is dedicated to terminals of the same type.

The aforementioned statement originates from the fact that the 5G core network is expected to evolve to implement service-oriented architecture, and a fixed, single type of network architecture will not be able to satisfy various service requirements.

In other words, it is not cost-effective to accommodate all the services expected to be provided by the 5G network in a single, fixed network architecture. Therefore, a consensus is formed that network architecture based on a physically fixed structure is divided logically into network slices to accommodate various service requirements.

SUMMARY

An aspect of the present disclosure may provide a method and apparatus for authenticating a device in a next-generation system (e.g., a 5G system).

Another aspect of the present disclosure may provide a method and apparatus for authenticating devices by authenticating a base station (BS) (i.e., eNB or eNodeB) managing devices used for a specific purpose.

Another aspect of the present disclosure may provide a method and apparatus for authenticating devices through a specific BS to which only devices used for a specific purpose are accessible to thereby allow the devices used for a specific purpose to access a wireless communication system.

The technical problems of the present invention are not limited to the above-described technical problems and the other technical problems will be understood by those skilled in the art from the following description.

According to an aspect of the present disclosure, an authentication method performed by a radio access network (RAN) node in a wireless communication system and apparatus thereof are provided.

In detail, an authentication method performed by a RAN node in a wireless communication system includes: transmitting, to a first network node, a first message indicating initiation of an authentication procedure of the RAN node for multiple user equipments (UEs) used for a specific purpose to attach to a network, the first message including first identification information for identifying the RAN node; receiving an authentication request message including first security information for authenticating the network from the first network node; authenticating the network based on the first security information; transmitting, to the first network node, second security information for authenticating the RAN node; and receiving a complete message indicating completion of the authentication procedure from the first network node, wherein the RAN node is associated with a specific entity performing a function of authentication a UE used for the specific purpose.

The first network node may perform an authentication function of authenticating UEs attaching to the network or a connection function of connecting a second network node performing the authentication function and the RAN node.

The authenticating of the network may include: generating an authentication vector for authenticating the network based on the security information; and authenticating the network based on the security vector.

The method may further include: performing connection to the specific entity, wherein the complete message may include an indicator indicating connection setup with the specific entity.

The method may further include: transmitting, to the first network node, a connection setup message requesting setup of connection through a specific interface, the connection setup message including an interworking request indicator requesting cooperatively operating the specific entity and the authentication function of the multiple UEs and identification information for identifying the specific entity; and receiving, from the first network node, a connection setup response message including an indicator indicating whether the interworking is accepted.

When the indicator indicates acceptance of interworking, the multiple UEs may perform an authentication procedure to attach to the network through the specific entity.

At least one UE authenticated through the specific entity, among the multiple UEs, may attach to the network through the RAN node.

According to another aspect of the present disclosure, a radio access network (RAN) node performing an authentication function to attach to a network in a wireless communication system, includes: a communication unit transmitting and receiving a radio signal to and from an external source; and a processor functionally coupled to the communication unit, wherein the processor transmits, to a first network node, a first message indicating initiation of an authentication procedure of the RAN Node for multiple user equipments (UEs) used for a specific purpose to attach to a network, the first message including first identification information for identifying the RAN Node, receives an authentication request message including first security information for authenticating the network from the first network node, authenticates the network based on the first security information, transmits, to the first network node, second security information for authenticating the RAN Node, and receives a complete message indicating completion of the authentication procedure from the first network node, wherein the RAN Node is associated with a specific entity performing a function of authentication a UE used for the specific purpose.

According to an embodiment of the present disclosure, since devices requiring high reliability and low latency in a next-generation system are authenticated through a base station (BS), multiple devices may be authenticated through a single procedure.

Also, according to an embodiment of the present disclosure, since devices used for a specific purpose are authenticated through a BS managing such devices, UEs may be authenticated through a method optimized according to attributes and features of UEs.

Also, according to an embodiment of the present disclosure, by authenticating a BS managing devices used for a specific purpose, the devices used for a specific purpose may attach to a network without a separate individual authentication procedure.

Also, according to an embodiment of the present disclosure, since an entity performing an authentication function of a network authenticates devices used for a specific purpose through a separate authentication entity, rather than through an individual authentication procedure, the authentication procedure may be effectively performed.

Also, according to an embodiment of the present disclosure, since devices are authenticated through an authentication entity related thereto according to a usage purpose of the devices, the devices may be authenticated through an authentication procedure appropriate for characteristics of the devices.

Also, according to an embodiment of the present disclosure, since an authentication procedure appropriate for characteristics of devices is performed through a specific entity, an effective authentication procedure may be performed in terms of scalability.

The effect of the present invention is not limited to the above-described effects and the other effects will be understood by those skilled in the art from the following description

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates one example of an EPS (Evolved Packet System) related to the LTE system to which technical features of the present invention may be applied FIG. 2 illustrates a security setting method which takes into account the whole network defined in the LTE(-A) system.

FIG. 3 illustrates one example of an initial key activation procedure in the E-UTRAN.

FIG. 4 is a flow diagram illustrating an authentication and key setting procedure at the time of an initial connection to the E-UTRAN.

FIG. 5 is a view illustrating an example of a network architecture proposed in the present disclosure.

FIG. 6 is a flow chart illustrating an example of a method for authenticating a RAN Node proposed in this disclosure.

FIG. 7 is a flow chart illustrating an example of a method for authenticating a RAN Node through a gateway proposed in this disclosure.

FIG. 8 is a block diagram of a wireless communication device to which methods proposed in this disclosure may be applied.

DETAILED DESCRIPTION

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

Embodiments of the present invention may be supported by standard documents disclosed for at least one of the IEEE 802, 3GPP, and 3GPP2 wireless access systems. In other words, among the embodiments of the present invention, those steps or parts not described for the purpose of clarifying the technical principles of the present invention may be supported by the documents. Also, all of the terms disclosed in the present invention may be described by the standard documents.

To clarify the description of the present invention, the 5G system is mainly dealt with. However, the technical features of the present invention is not limited to the specific system, but may be equally applied to the 3GPP LTE/LTE-A system.

In what follows, before describing the present invention with reference to appended drawings, terms used in the present document are defined briefly for the understanding of the present invention.

APN (Access Point Name): a name of an access point managed by a network, which is provided to a UE. In other words, it indicates the name (character string) of a PDN. On the basis of the name of the access point, the corresponding PDN for transmitting and receiving data is determined.

MME: short for Mobility Management Entity, which is responsible for controlling each entity within an EPS to provide a session and mobility for a UE.

Session: a passage for data transmission. PDN, Bearer, IP flow unit, and so on may be used as a session unit.

As defined in the 3GPP specification, each unit may be distinguished by its application range: a unit for describing the whole network (APN or PDN scale), a unit for describing QoS within the network (Bearer scale), and a destination IP address unit.

TIN: Temporary Identify used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, a UE identifier known to the MME.

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

FIG. 2 illustrates a security setting method which takes into account the whole network defined in the LTE(-A) system.

With reference to FIG. 2, the current LTE/LTE-A system performs authentication simultaneously with connection to an MME of a core network regardless of the service provided to the UE, and as a result of the authentication, sets up a NAS/AS key, and performs communication to receive a service.

FIG. 3 illustrates one example of an initial key activation procedure in the E-UTRAN.

FIG. 4 is a flow diagram illustrating an authentication and key setting procedure at the time of an initial connection to the E-UTRAN.

In other words, FIG. 3 illustrates an overall procedure through which authentication and key setting for a UE is performed when the user performs an initial connection in the 4G system (LTE(-A) system).

With reference to FIG. 3, after performing a random access, the UE establishes an RRC connection to an eNB through a first to third procedures (RRC Connection Setup Request, RRC Connection Setup, and RRC Connection Setup Complete).

Afterwards, through the Attach procedure to the MME, the UE performs authentication and key setting for data/control signaling protection of the AS/NAS layer.

FIG. 4 elaborates the authentication procedure performed in the network access procedure of FIG. 3.

FIG. 4 shows only the parts necessary for the UE to perform the initial access, but excludes those parts which may be performed selectively depending on situations.

However, a 3GPP access network connected to a core network in a next-generation communication system (e.g., 5G, etc.) is a new RAT and eLTE and, unlike the related art, a non-3GPP such as WLAN, or the like, is also anticipated to be directly connected to a 5G NGC.

Compared with security characteristics of the existing communication system, security features anticipated to be added in a next-generation communication system are as follows.

The 5G mobile communication system is required to accommodate a new type service delivery model such as network slicing. Network slicing refers to providing a virtual isolated sub-network optimized for service characteristics. Accordingly, requirements of applications may be different, and thus, an optimized service is required to be provided by applications. In line with this, security architecture is required to be configured to be flexible according to service characteristics of each network slice, which means that security-related overhead should be designed to be discriminatedly applied depending on services when the 5G mobile communication network adopts network slicing.

The 5G mobile communication system is required to be designed to accommodate new verticals (industries), as well as to provide new functions. This aims at accommodating a new business model regarding how communication is to be provided through a mobile communication network, and a new trust model considering various types of devices (e.g., unattended machines, sensors, wearable devices, vehicles, etc.) and some important sectors (e.g., public safety, e-health, etc.) having different security requirements should be defined.

The 5G mobile communication system is required to provide optimized multi-RAT operations. Multi-RAT accesses having different security mechanisms aim to reduce over-the-air (OTA) signaling required for authentication/security setup, or the like, or delay each time. That is, up to the related art 4G system, when different RATs are accessed, separate UE authentication and security setup are performed due to different authentication schemes or a security setup mechanism such as key handling, or the like, although a core network is the same, but in the 5G system, an effective multi-RAT security architecture capable of reducing such redundancy is required to be provided.

Industrial control is a use case among important issues discussed in relation to a next-generation communication system. Industrial control has a concept of controlling an integrated production system automating production facilities using a computer, a robot, and a control system from manufacturing design of a product to production, which includes all control systems such as conveyer, an industrial robot, a quality inspection device, automated warehouse, an autonomous guided vehicle, a numerical measurement and control machine tool, and the like.

Applications of such industrial control have relatively low data rate requirements. However, since the applications require high reliability and low delay (~1 ms), they traditionally rely on wired connection or tailored wireless solutions.

Wired connection is easy to provide fast and high bandwidth/reliability but may be difficult to apply to every situation due to physical wires, and dedicated wireless solutions lack a globally available frequency band and incur high cost of installation/operation.

Also, the use of wireless technologies does not provide sufficient performance in terms of real time and reliability.

Also, in relation to a security mechanism for supporting a 5G use case, whether an industrial factory should serve as a connectivity provider or whether the industrial factory should support only a factory service access on the basis of connectivity provided by an operator has not definitely been determined, and also, whether to use a security mechanism in which factory control is provided by an operator or whether to use a separate self-security mechanism on the basis of cellular connectivity provided by 3GPP from a vantage point of security has not been determined.

Thus, the present disclosure proposes an authentication method and apparatus for controlling devices used for a specific purpose using a wireless communication system.

FIG. 5 is a view illustrating an example of a network architecture proposed in the present disclosure.

In order to perform authentication to control devices used for a specific purpose using a wireless communication system according to the present disclosure, a security mechanism of an existing wireless communication system may be used as is or may be optimized to be used or a new mechanism based on simple authentication, a key exchange method, and the like, different from the security mechanism of the existing wireless communication system may be designed in consideration of attributes (e.g., massive, power constrained) of UEs.

Hereinafter, the present disclosure proposes a method for designing a new mechanism described above for security of a next-generation wireless communication system for supporting a specific purpose (e.g., industrial factory automatic/control).

That is, in the present disclosure, service access regarding devices used for a common specific purpose are supported on the basis of connectivity provided by an operator, for which a self-security mechanism may be used.

Hereinafter, an example of a device used in an industrial factory will be described as an example of devices used for a specific purpose.

However, the present disclosure is not limited thereto and may also be applied to devices used for various other purposes.

The present disclosure proposes a method for determining reliability of a factory-dedicated authentication entity performing an authentication function regarding devices/equipment within coverage provided in which a factory service is provided by enabling a next-generation mobile communication (e.g., 5G) network to authenticate a base station (BS) (i.e., eNB or eNodeB) related to (or associated with) an entity authenticating factory-dedicated devices/equipment for a factory automation/control service.

That is, the present disclosure proposes a method for authenticating devices/equipment providing a service related to a factory by authenticating a BS related to (or associated with) an entity authenticating factory-dedicated devices/equipment.

As illustrated in FIG. 2, the 5G network for accommodating industrial factories include a dedicated authentication entity performing authentication to authenticate a factory-dedicated BS for accommodating access of devices and devices for providing a factory service within factory coverage.

here, the dedicated authentication entity is associated with the factory-dedicated BS.

In the network architecture illustrated in FIG. 5, two methods for connecting factory-dedicated BSs to the 5G core network may be considered.

First, in cases where a safe interface for data transmission and reception to authenticate a device is present between the factory-dedicated BS and the 5G authentication entity, the factory-dedicated BS may be directly connected to the 5G authentication entity for authenticating 5G UEs.

Second, in cases where a safe interface is not present between the factory-dedicated BS and the 5G authentication entity, the factory-dedicated BS may be connected to a 5G core network (e.g., a 5G authentication entity) through a 5G security gateway (SEG).

Here, the 5G SEG serves as an entry point for every factory-dedicated BS to be connected to the 5G authentication entity.

The 5G authentication entity is connected to a 5G factory eNB server which stores and manages an ID of every factory-dedicated BS directly or indirectly connected to the 5G authentication entity and any other factory related information (e.g., factory-dedicated authentication entity information, etc.).

Differences of the methods are as follows.

1) Method in which Factory-Dedicated BS is Directly Connected to 5G Authentication Entity In cases where a third party (e.g., a factory, etc.) providing a type of service not provided by a mobile communication provider (MNO) is present, although the corresponding third party is connected to the MNO to use a 5G network, the factory may perform authentication to access a service provided by the factory itself, and to this end, the factory may maintain information regarding every device/equipment operating in coverage of the factory.

Here, authentication on the factory-dedicated BS is performed through the 5G authentication entity and a 5G factory eNB server.

2) Method in which Factory-Dedicated BS is Connected to 5G Authentication Entity Through 5G SEG As in the scenario described in 1), the factory may perform authentication to access a service provided by the factory itself, and to this end, the factory may maintain information regarding every device/equipment operating within coverage of the factory.

Unlike the method described in 1), authentication on the factory-dedicated BS is performed through the 5G SEG in the second method, and the 5G SEG may inform the 5G authentication entity about whether authentication of the factory-dedicated BS has been successful or failed.

The method and apparatus proposed in this disclosure may effectively authenticate devices/equipment within a factory in cases where a 5G network is configured such that a factory-dedicated BS associated with a factory-dedicated device/equipment authentication entity is connected to the 5G core network for industrial factory applications requiring high reliability (e.g., packet error rate <10-6) and availability (e.g., availability >99.999%), while satisfying low latency requirements of 1 ms or less in providing a remote control service such as industrial robots, or the like.

Also, the present disclosure proposes a method for determining reliability regarding a factory-dedicated authentication entity by authenticating a BS associated with an entity authenticating factory-dedicated devices/equipment.

Effectively authenticating devices/equipment within a factory means that numerous devices/equipment within specific factory coverage are authenticated by an authentication entity associated with a factory-dedicated BS authenticated by a 5G network entity (e.g., an authentication entity or the SEG), rather than by the 5G authentication entity one by one, thereby effectively providing an industrial factory service in terms of scalability.

FIG. 6 is a flow chart illustrating an example of a method for authenticating a RAN Node proposed in this disclosure.

Referring to FIG. 6, a 5G authentication entity (authentication entity 2) authentication a factory-dedicated BS (RAN Node) interworking with a factory-dedicated authentication entity (authentication entity 1) to thereby determine reliability of the factory-dedicated authentication entity related to the factory-dedicated BS, and when the factory-dedicated authentication entity is reliable, the 5G authentication entity instructs the factory-dedicated BS to accept interworking with respect to the factory-dedicated authentication entity so that the factory-dedicated authentication entity may perform authentication on the devices/equipment within coverage in which a factory service is provided In detail, when the RAN Node for providing a specific factory service is installed in a network, subscription information of the installed RAN Node is stored in a server.

Here, the subscription information of the RAN Node may include identification information for identifying the installed RAN Node and identification information for identifying the authentication entity 1 related to the installed RAN Node.

Also, the server shares a master key for authentication and security of the installed RAN Node with the RAN Node.

The RAN Node transmits identification information (e.g., an ID) for identifying the RAN Node to the the authentication entity 2 (first network node) to thereby inform the authentication entity 2 about initiation of an authentication procedure.

Here, the identification information (first identification information) may be included in an authentication initiate message (first message) and transmitted to the authentication entity 2 (S6010).

The identification information for identifying the RAN Node may include information such as a PLMN ID, a factory ID, a RAN Node Serial Number, and the like.

Upon receiving the identification information from the RAN Node, the authentication entity 2 stores first identification information and determines a method for authentication the RAN Node through the identification information of the RAN Node.

That is, the authentication entity 2 recognizes that the RAN Node and devices intended to access a network through the RAN Node are terminals used for a specific purpose through the received first identification information, and determines that an authentication procedure different from an authentication procedure of general devices is required for the RAN Node.

The authentication entity 2 performing a function of authenticating devices intended to be connected to the 5G network transmits a request message including a RAN Node ID, a PLMN ID of the authentication entity 2, and the like, to the sever to request information required for authenticating the RAN Node (S6020).

The server receives the request message from the authentication entity 2 and generates an authentication vector for authenticating the RAN Node.

Here, the authentication vector may be generated on the basis of a master key shared between the RAN Node and the server, the RAN Node ID, and the like, and may include information such as RAND, AUTN, an authentication token, XREX, and the like.

The server transmits a response message including the generated authentication vector and the identification information (second identification information) for identifying the authentication entity 1 associated with the RAN Node to the authentication entity 2 in response to the request message (S6030).

Here, the identification information for identifying the authentication entity 1 is used for the authentication entity 2 to determine whether the authentication entity 1 is reliable, after authentication of the RAN Node is completed.

Upon receiving the identification information 2 from the server, the authentication entity 2 stores the identification information 2 together with the identification information 1.

In order to authenticate the RAN Node, the authentication entity 2 transmits an authentication request message including security information (first security information) to the RAN Node (S6040).

The first security information may include the RAND and the authentication token among values of the authentication vector generated by the authentication entity 2.

Upon receiving the first security information through the authentication request message from the authentication entity 2, the RAN Node generates an authentication vector using the same method as that of the authentication entity 2.

The RAN Node authenticates the authentication entity 2 to authenticate whether a current network is a network to which the RAN Node wants to access though the generated authentication vector.

After authenticating whether the current network is a network to which the RAN Node wants to access by authenticating the authentication entity 2, the RAN Node transmits an authentication response message including security information (second security information) (S6050).

The second security information may include RES among the values of the authentication vector generated by the RAN Node.

Upon receiving the authentication response message, the authentication entity 2 authenticates the RAN Node through the second security information and transmits an authentication complete message indicating an authentication result to the RAN Node (S6060).

If the authentication entity 2 fails to authenticate the RAN Node, the authentication entity 2 transmits an authentication failure message, instead of the authentication complete message, to the RAN Node, and the authentication procedure terminates.

The authentication failure message indicates that the RAN Node has not been authenticated.

However, when the authentication entity 2 successfully authenticates the RAN Node, the authentication complete message indicates that the RAN Node has been authenticated and the authentication procedure has been completed and includes an indicator indicating to the RAN Node to establish connection to the authentication entity 1.

Upon receiving the authentication complete message indicating success in authentication from the authentication entity 2, the RAN Node establishes connection with the authentication entity 1.

Thereafter, the RAN Node transfers a result regarding connection setup when an interface is configured with the authentication entity 2 to determine whether the authentication entity 2 trusts the authentication entity 1, and the RAN Node determines whether to authenticate UEs by interworking with the authentication entity 2.

That is, the RAN Node transmits a setup request message requesting connection setup of a S1 interface to the authentication entity 2 (S6070).

The setup request message may include an interworking request indicator requesting interworking to cooperatively operate the authentication entity 1 and authentication function of UEs used for a specific purpose and identification information (third identification information 0 for identifying the authentication entity 1.

The identification information may include an ID of the authentication entity 1 and/or an IP address.

Upon receiving the setup request message, the authentication entity 2 compares the second identification information obtained from the server in the procedure for authenticating the RAN Node and the third identification information obtained from the RAN Node.

The authentication entity 2 transmits a setup response message including result information indicating whether the authentication entity 1 is reliable according to a comparison result to the RAN Node (S6080).

When the second identification information and the third identification information are not identical according to the comparison result so the authentication entity 1 is determined as an unreliable entity, the authentication entity 2 includes an indicator indicating that interworking is not accepted in a setup response message, and transmits the setup response message.

If, however, the second identification information and the third identification information are identical according to the comparison result so the authentication entity 1 is determined as a reliable entity, the authentication entity 2 includes an indicator indicating that interworking is accepted in a setup response message, and transmits the setup response message.

Thereafter, devices within coverage of the RAN Node to provide a specific service may be authenticated to access a network through the authentication entity 1, and when authenticated, the device may access the network through the RAN Node.

In this manner, by authenticating the RAN Node managing the devices used for a specific purpose, the devices may be authenticated to access the network for wireless communication through a separate authentication entity associated with the RAN Node.

Through this method, since a network node performing a function of authenticating devices which access the 5G network is not required to individually authenticate the devices used for a specific purpose one by one, UEs may be effectively authenticated.

Also, since the devices used for various purposes are able to access the network for wireless communication, the wiredly controlled devices may be automated and controlled through wireless communication.

FIG. 7 is a flow chart illustrating an example of a method for authenticating a RAN Node through a gateway proposed in this disclosure.

Referring to FIG. 7, when the 5G SEG (Gateway) receives identification information regarding a factory-dedicated authentication entity (authentication entity 1) related to a factory-dedicated BS (RAN Node) from the factory-dedicated BS, the 5G SEG verifies a certificate of the factory-dedicated BS and transmits verified information to the 5G operator authentication entity (authentication entity) so that the 5G operator authentication entity may determine whether the factory-dedicated BS and the factory-dedicated authentication entity are reliable.

Thereafter, in cases where the factory-dedicated BS and the factory-dedicated authentication entity are reliable, devices for providing a factory service may be authenticated through the factory-dedicated authentication entity to access the 5G network.

In detail, when the RAN Node for providing a specific factory service is installed in the network, subscription information of the installed RAN Node is stored in the server.

Here, the subscription information of the RAN Node may include identification information for identifying the installed RAN Node and identification information for identifying the authentication entity 1 related to the installed RAN Node.

Also, the server shares a master key for authentication and security of the installed RAN Node with the RAN Node.

The RAN Node transmits an authentication information request message requesting initiation of an authentication procedure to the gateway to perform a mutual authentication procedure based on the certificate (or authentication information) (S7010).

The authentication information request message is a message for informing the gateway about initiation of the authentication procedure and may be used by other name such as a IKE_SA_INI (Internet Key Exchange Security Association) Request message, or the like.

The gateway transmits an authentication information response message to the RAN Node in response to the authentication information request message (S7020).

The authentication information response message may also be used by other name such as a IKE_SA_INI (Internet Key Exchange Security Association) Response message, or the like.

The gateway may request an authentication certificate (or authentication information) of the RAN Node for authentication certificate-based mutual authentication from the RAN Node through an authentication information response message.

The RAN Node may transmit an authentication request message including an authentication certificate and identification information identifying the authentication entity 1 as an authentication entity associated with the RAN Node to the gateway in response to the request from the gateway (S7030).

The authentication certificate may include a PLMN ID, a factory ID, a serial number of the RAN Node, and the like.

The gateway verifies the authentication certificate obtained from the RAN Node to identify the RAN Node and transmits an authentication response message indicating an identifying result to the RAN Node (S7040).

If the gateway fails to identify the RAN Node, the authentication response message indicates that the RAN Node is an unidentified RAN Node, and the authentication procedure terminates.

If, however, the gateway successfully identifies the RAN Node, the authentication response message indicates that the RAN Node has been identified, and includes an authentication certificate of the gateway.

Here, when authentication of the RAN Node is completed, the gateway includes an indicator indicating a connection setup with the authentication entity 1 in the authentication response message and transmits the corresponding authentication response message.

The RAN Node authenticates whether the current network is a network to which the RAN Node wants to attach, through the authentication certificate obtained from the gateway.

Upon authenticating whether the current network is a network to which the RAN Node wants to attach through the authentication certificate, the RAN Node establishes connection to the authentication entity 1.

Thereafter, when an interface is configured with the authentication entity 2, the RAN Node transfers a result of the connection setup so that the authentication entity 2 may trust the authentication entity 1, and the RAN Node determines whether to authenticate UEs by interworking with the authentication entity 2.

That is, the RAN Node transmits a setup request message requesting connection setup of an S1 interface with the authentication entity 2 (S7050).

The setup request message may include an interworking request indicator requesting interworking to cooperatively operating authentication functions of UEs used for a specific purpose with the authentication entity 1 and identification information (first identification information) for identifying the authentication entity 1.

The first identification information may include an ID of the authentication entity 1 and/or an IP address.

The gateway additionally includes identification information (e.g., the DI of the RAN Node, etc.) for identifying that the RAN Node is an authentication-completed RAN Node in the setup request message received from the RAN Node, and transmits the corresponding setup request message to the authentication entity 2 (S7060).

The authentication entity 2 transmits a notification message including the identification information of the RAN Node to the server (S7070).

The server checks an authentication entity associated with the RAN Node on the basis of the received identification information of the RAN Node, and transmits a notification response message including identification information (second identification information) for identifying the authentication entity associated with the RAN Node to the authentication entity 2 (S7080).

The second identification information may include an ID of the authentication entity associated with the RAN Node and/or an IP address.

Upon receiving the notification response message, the authentication entity 2 compares the first identification information and the second identification information to determine whether the authentication entity 1 is a reliable authentication entity.

The authentication entity 2 transmits a setup response message to the gateway in response to the setup request of the S1 interface (S7090).

The setup response message may include result information indicating whether the authentication entity 1 is a reliable entity.

If the first identification information and the second identification information are not identical so the authentication entity 1 is determined as an unreliable authentication entity, the result information indicates that the authentication entity 1 is an unreliable authentication entity.

Also, the authentication entity 2 includes an indicator indicating that interworking is not accepted in the setup response message and transmits the corresponding setup response message.

If, however, the first identification information and the second identification information are identical so the authentication entity 1 is determined as a reliable authentication entity, the result information indicates that the authentication entity 1 is a reliable authentication entity.

Also, the authentication entity 2 includes an indicator indicating that interworking is accepted in the setup response message, and transmits the corresponding setup response message.

Thereafter, the gateway transmits the setup response message received from the authentication entity 2 to the RAN Node (S7100).

Thereafter, in order to provide a specific service, devices present within coverage of the RAN Node may be authenticated by the authentication entity 1 to access the network, and when authenticated, the devices may attach to the network through the RAN Node.

In this embodiment, steps S7060 to S7090 may be performed after step S7030.

In this manner, by authenticating the RAN Node managing devices used for a specific purpose through the gateway, a device for attaching to a network for wireless communication may be authenticated through a separate authentication entity associated with the RAN Node.

Through this method, the network node performing the function of authenticating devices attaching to the 5G network is not required to authenticate devices used for a specific purpose one by one, and thus, UEs may be effectively authenticated.

Also, since devices used for various purposes may attach to the network for wireless communication, wiredly controlled devices may be automated and controlled through wireless communication.

FIG. 8 is a block diagram of a wireless communication device to which methods proposed in this disclosure may be applied.

Here, the wireless device may be an eNB or a UE, and the eNB includes all of a macro eNB, a RAN Node, and a small eNB.

As illustrated in FIG. 8, the eNB 810 and the UE 820 include communication units (transceiver units or RF units 813 and 823), processors 811 and 821, and memories 812 and 822, respectively.

In addition, the eNB and the UE may further include an input unit and an output unit.

The communication units 813 and 823, the processors 811 and 821, the input unit, the output unit, the memories 812 and 822 are functionally connected to perform a method proposed in this disclosure.

When information created from a physical layer (PHY) protocol is received, the communication units (transceiver units or RF units 813 and 823) move the received information to a radio-frequency (RF) spectrum, perform filtering, amplification, and the like, and transmit corresponding information to an antenna. Also, the communication units 813 and 823 serve to move an RF signal received by the antenna to a band in which the RF signal can be processed in the PHY protocol, and perform filtering thereon.

Also, the communication units 813 and 823 may have a switch function for switching transmission and reception functions.

The processors 811 and 821 implement functions, processes and/or methods proposed in this disclosure. Layers of a radio interface protocol may be implemented by the processors 811 and 821.

The processors 811 and 821 may also be expressed by a controller, a control unit, a computer, and the like.

The memories 812 and 822 are connected to the processors 811 and 821 to store a protocol or a parameter for performing an uplink resource allocation method, respectively.

The processors 811 and 821 may include an application-specific integrated circuit (ASIC), another chip set, a logic circuit and/or data processing device.

The memories 812 and 822 may include a read-only memory (ROM), a random access memory (RAM), a flash memory, a memory card, a storage medium and/or any other storage device. The communication units 813 and 823 may include a baseband circuit for processing a wireless signal. When an embodiment is implemented by software, the aforementioned techniques may be implemented by a module (process, function, etc.) performing the aforementioned functions.

The module may be stored in the memory 812 or 822 and executed by the processor 811 or 821. The memory 812 or 822 may be present within or outside the processor 811 or 821 mad may be connected to the processor 811 or 821 through a well-known unit.

The output unit (display unit) is controlled by the processor 811 or 821, and outputs information output from the processor 811 or 821, together with a key input signal generated by a key input unit and various type information signals from the processor 811 or 821.

According to an embodiment of the present disclosure, since devices requiring high reliability and low latency in a next-generation system are authenticated through a base station (BS), multiple devices may be authenticated through a single procedure.

Also, according to an embodiment of the present disclosure, since devices used for a specific purpose are authenticated through a BS managing such devices, UEs may be authenticated through a method optimized according to attributes and features of UEs.

Also, according to an embodiment of the present disclosure, by authenticating a BS managing devices used for a specific purpose, the devices used for a specific purpose may attach to a network without a separate individual authentication procedure.

Also, according to an embodiment of the present disclosure, since an entity performing an authentication function of a network authenticates devices used for a specific purpose through a separate authentication entity, rather than through an individual authentication procedure, the authentication procedure may be effectively performed.

Also, according to an embodiment of the present disclosure, since devices are authenticated through an authentication entity related thereto according to a usage purpose of the devices, the devices may be authenticated through an authentication procedure appropriate for characteristics of the devices.

Also, according to an embodiment of the present disclosure, since an authentication procedure appropriate for characteristics of devices is performed through a specific entity, an effective authentication procedure may be performed in terms of scalability.

The effect of the present invention is not limited to the above-described effects and the other effects will be understood by those skilled in the art from the following description Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

As for the method and apparatus for authenticating a terminal between heterogeneous networks in a wireless communication system according to the present disclosure, the configuration and method according to the embodiments of the present disclosure described above are not limited in its application, but the entirety or a portion of the embodiments may be selectively combined to be configured into various modifications.

In the embodiments of the present invention, the method for transmitting and receiving data according to the present disclosure may be implemented as codes that can be read by a processor provided in a network device in a recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific exemplary embodiments have been described. However, the present disclosure is not limited to the specific exemplary embodiments and various modifications may be made without departing from the scope of the present invention claimed in the claims, and such modifications should not be individually understood from technical concepts or prospects of the present disclosure.

Further, although the disclosure has described both product inventions and process inventions, description of both inventions may be complementarily applied as needed.

In the wireless communication system of this disclosure, an example of the method and apparatus for authenticating a device in a wireless communication system applied to a 3GPP LTE/LTE-A system has been described, but the method and apparatus for establishing a session for data transmission and reception in a wireless communication system may also be applied to various other wireless communication systems, as well as to the 3GPP LTE/LTE-A system.

What is claimed is:

1. An authentication method performed by a radio access network (RAN) node in a wireless communication system, the method comprising:
  transmitting, to a first network node, a first message indicating initiation of an authentication procedure of the RAN node for multiple user equipments (UEs) used for a specific purpose to attach to a network, wherein the first message includes first identification information for identifying the RAN node;

receiving an authentication request message including first security information for authenticating the network from the first network node;

authenticating the network based on the first security information; transmitting, to the first network node, second security information for authenticating the RAN node;

receiving a complete message indicating completion of the authentication procedure from the first network node;

transmitting, to the first network node, a connection setup message requesting setup of connection through a specific interface, wherein the connection setup message includes an interworking request indicator requesting cooperatively operating a specific entity and the authentication function of the multiple UEs and identification information for identifying the specific entity; and receiving, from the first network node, a connection setup response message including an indicator indicating whether the interworking is accepted, wherein the RAN node is associated with the specific entity performing a function of authentication a UE used for the specific purpose.

2. The method of claim 1, wherein the first network node performs an authentication function of authenticating UEs attaching to the network or a connection function of connecting a second network node performing the authentication function and the RAN node.

3. The method of claim 1, wherein the authenticating of the network comprises:
generating an authentication vector for authenticating the network based on the security information; and
authenticating the network based on the authentication vector.

4. The method of claim 1, further comprising:
establishing connection with the specific entity,
wherein the complete message includes an indicator indicating connection setup with the specific entity.

5. The method of claim 1, wherein when the indicator indicates acceptance of interworking, the multiple UEs perform an authentication procedure to attach to the network through the specific entity.

6. The method of claim 5, wherein at least one UE authenticated through the specific entity, among the multiple UEs, attaches to the network through the RAN node.

7. A radio access network (RAN) node performing an authentication function to attach to a network in a wireless communication system, the RAN node comprising:
a communication unit transmitting and receiving a radio signal to and from an external source; and
a processor functionally coupled to the communication unit, wherein the processor is configured to
transmit, to a first network node, a first message indicating initiation of an authentication procedure of the RAN Node for multiple user equipments (UEs) used for a specific purpose to attach to the network,
wherein the first message includes first identification information for identifying the RAN Node,
receive an authentication request message including first security information for authenticating the network from the first network node,
authenticate the network based on the first security information,
transmit, to the first network node, second security information for authenticating the RAN Node,
receive a complete message indicating completion of the authentication procedure from the first network node,
transmit, to the first network node, a connection setup message requesting setup of connection through a specific interface,
wherein the connection setup message includes an interworking request indicator requesting cooperatively operating a specific entity and the authentication function of the multiple UEs and identification information for identifying the specific entity, and
receive, from the first network node, a connection setup response message including an indicator indicating whether the interworking is accepted,
wherein the RAN Node is associated with the specific entity performing a function of authentication a UE used for the specific purpose.

8. The RAN node of claim 7, wherein the first network node performs an authentication function of authenticating UEs attaching to the network or a connection function of connecting a second network node performing the authentication function and the RAN node.

9. The RAN node of claim 7, wherein the processor is further configured to,
generate an authentication vector for authenticating the network based on the security information, and
authenticate the network based on the authentication vector.

10. The RAN node of claim 7, wherein the processor is further configured to,
establish connection with the specific entity, wherein the complete message includes an indicator indicating connection setup with the specific entity.

11. The RAN node of claim 7, wherein when the indicator indicates acceptance of interworking, the multiple UEs perform an authentication procedure to attach to the network through the specific entity.

12. The RAN node of claim 11 wherein at least one UE authenticated through the specific entity, among the multiple UEs, attaches to the network through the RAN node.

* * * * *